United States Patent [19]

Swadley

[11] 4,086,991
[45] May 2, 1978

[54] THERMALLY ACTUATED DISCONNECT COUPLING

[75] Inventor: Gerald L. Swadley, Rockford, Ill.

[73] Assignee: Sundstrand Corporation, Rockford, Ill.

[21] Appl. No.: 732,249

[22] Filed: Oct. 14, 1976

[51] Int. Cl.$^2$ .............................................. F16D 43/25
[52] U.S. Cl. .................................. 192/82 T; 64/28 R; 192/67 R; 403/28
[58] Field of Search ................. 192/67 R, 67 A, 82 T; 64/28 R; 403/28

[56] References Cited

U.S. PATENT DOCUMENTS

| | | | |
|---|---|---|---|
| 2,539,534 | 1/1951 | Eckhardt | 64/28 R |
| 3,064,454 | 11/1962 | Sharples | 64/28 R |
| 3,212,613 | 10/1965 | Carlson | 192/82 T |
| 3,889,789 | 6/1975 | Boehringer | 64/28 R X |
| 3,960,253 | 6/1976 | Sigg | 192/67 A |

Primary Examiner—Allan D. Hermann
Attorney, Agent, or Firm—Ted E. Killingsworth; William R. Peoples; Michael B. McMurry

[57] ABSTRACT

A thermally actuated disconnect coupling includes a coupling shaft normally connected between a drive member and a driven member to transmit torque from the drive member to the driven member. Within the driven member, a fusible element such as a eutectic pellet supports the coupling shaft against axial movement during normal in-service use of the coupling. Providing the connection between the coupling shaft and the drive member are axially straight splines formed both on the coupling shaft and the drive member. At the other end of the coupling shaft, helical splines formed on the coupling shaft and the driven member provide means whereby torque is transmitted through the coupling shaft to driven member. The axial length of the helical splines is greater than the axial length of the straight splines. When the pellet is melted, such as by overheating, an axially directed component of the force transmitted by the helical splines propels the coupling shaft away from the drive member thereby disconnecting the drive and driven members.

10 Claims, 3 Drawing Figures

THERMALLY ACTUATED DISCONNECT COUPLING

BACKGROUND OF THE INVENTION

This invention relates generally to a thermally actuated disconnect coupling of the type such as may be utilized in an aircraft to provide the drive connection between the output shaft of the aircraft engine gearbox and the input drive shaft of the aircraft's constant speed drive. More particularly, the invention relates to a thermally actuated disconnect which includes a fusible element such as a solder pellet located between parts of the coupling so that, when parts of the constant speed drive fail and become overheated, the pellet melts and the coupling disconnects from the gearbox thereby shutting down the constant speed drive to avoid causing excessive damage to the drive and other parts of the aircraft. In a thermally actuated disconnect coupling of the present type, a coupling shaft includes inner and outer end sections each having splines mating with the output shaft of the engine gearbox and the input drive shaft of the constant speed drive, respectively. Typically, the pellet supports the coupling shaft to hold the splines in mating engagement with each other for torque to be transmitted through the shaft from the gearbox output shaft and to the constant speed drive input shaft.

One coupling of the foregoing general character is disclosed in U.S. Pat. No. 3,889,789 and includes a dog clutch located between the inner and outer sections of the coupling shaft. When the supportive solder melts, the dog clutch between the two shaft sections disengages and the inner end section of the shaft is retracted into the driven shaft while the outer end section of the coupling shaft remains in the gearbox output shaft.

SUMMARY OF THE INVENTION

The primary object of the present invention is to provide a new and improved thermally actuated disconnect coupling of the above general character which is more compact and stronger for its size than prior similar couplings, the new coupling being capable of transmitting greater torque for its size and thus providing a stronger connection with the output shaft of the gearbox during normal in-service use than prior similar couplings of the same general size. A more detailed object is to achieve the foregoing by utilizing a helical spline connection within the coupling, the spline connection serving to transmit torque from the output shaft when the eutectic pellet is solid but causing the coupling to disengage completely from the output shaft when the pellet melts. Advantageously, the helical spline connection introduces a strong axially directed component of the force transmitted by the coupling shaft so that, when the pellet melts, the axial component of the force propels the coupling shaft in an axial direction, disengaging both the outer end section of the shaft from the drive shaft and the inner end section of the coupling shaft from the driven shaft.

The invention also resides in the novel construction of the coupling with the opposite end sections of the coupling shaft being integral with each other so as to require fewer separate operating parts in the coupling than is employed in prior similar couplings. In addition, the invention resides in the novel size relationship between the helical spline connection and the axially straight spline connection so as to eliminate the need for means such as a spring for keeping parts of the coupling away from the drive shaft once the coupling has disconnected itself from the drive shaft.

These and other objects and advantages of the present invention will become more apparent from the following detailed description when taken in conjunction with the accompanying drawings.

DETAILED DESCRIPTION OF THE PREFERRED EMBODIMENT

Figure 1:
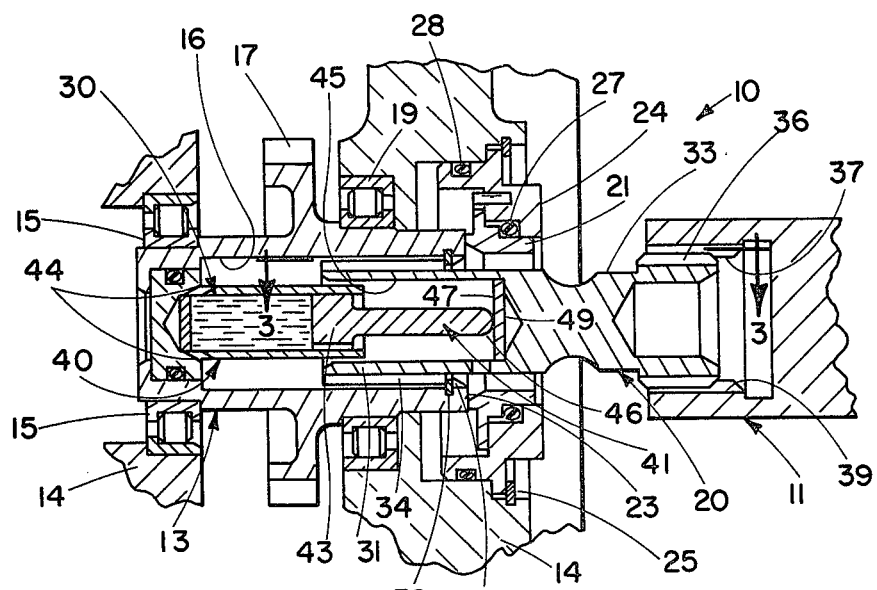
FIG. 1 is a fragmentary cross-sectional view of a thermally actuated disconnect coupling embodying the novel features of the present invention.

As shown in the drawings for purposes of illustration, the present invention is embodied in a thermally actuated disconnect coupling 10 particularly adapted for use in transmitting torque between a drive member 11 and a driven member 13 during normal in-service use. When the driven member becomes overheated, the coupling automatically disconnects from the drive member. Typically, a coupling of this type may be used in an aircraft to provide the connection between a drive member 11, such as the output shaft of the engine powered gearbox of the aircraft, and the input driven member 13 of a constant speed drive (not shown). In this environment, it is important that the torque transmitted to the constant speed drive be terminated in the event of a failure in the system so as to avoid overheating of the drive and perhaps serious damage to the drive and other parts of the aircraft.

Herein, the coupling 10 is mounted within the sidewalls of a housing 14 and includes the driven member 13 whose inner end portion is supported by bearings 15 within the housing. More particularly, the driven member 13 is in the form of a tubular shaft including an axially directed chamber 16 and a peripheral gear 17 disposed intermediate the ends of the shaft 13. Supporting the outer end portion of the driven shaft 13 radially and against axial movement out of the housing 14 are bearings 19 disposed within the sidewall of the housing. More particularly, as shown in FIG. 1, the axial chamber 16 of the shaft telescopically receives a coupling shaft 20 normally extending between the drive shaft 11 and the input or driven shaft 13. Sealing between the sidewall of the housing and the driven shaft 13 is achieved through the provision of a sealing ring 21 which is captivated against the outer end 23 of the shaft 13 by a retaining ring 24 that, in turn, is held in place by a snap ring 25. O-rings 27 and 28 are disposed between the sealing ring 21 and retaining ring 24, and between the retaining ring 24 and the housing 14, respectively, to keep the operating fluid of the constant speed drive from leaking out of the housing 14.

In normal service use, the coupling shaft 20 is supported against axial movement by a fusible element such as a eutectic pellet 30 formed of solder. The pellet supports the coupling shaft so that the inner end section 31 thereof is connected with the driven member or shaft 13 and so that the outer end section 33 of the coupling shaft is connected to the drive shaft 11. Thus, if the drive shaft is rotated, torque is transmitted through the coupling shaft to the driven member 13. If for some reason during the operation of the constant speed drive the operating fluid becomes overheated, the solder pellet 30 will melt, thereby allowing the coupling shaft to slide in an axial direction to disconnect the drive and driven members 11 and 13.

In accordance with the primary aspect of the present invention, the coupling 10 is more compact and stronger for its size than prior similar couplings. This is achieved by constructing the coupling shaft 20 so that the opposite end sections 31 and 33 are integral with each other, thereby providing a continuous shaft, and through the provision of normally mating helical splines 34 and 35 formed on one of the sections 31 and 33 and one of the members 11 and 13 for transmitting torque between the coupling and the member. Advantageously, the helical splines provide a stronger connection between the coupling shaft and the drive or driven member and further allow the coupling shaft to be made as one continuous part thereby reducing the number of parts in the coupling and generally simplifying its construction.

Figure 3:
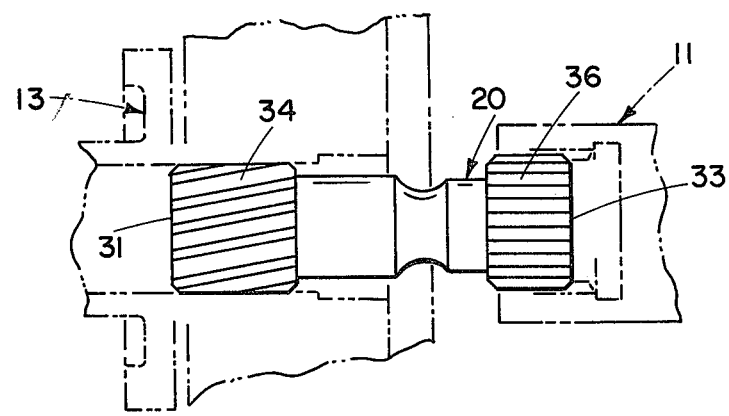
FIG. 3 is a view taken substantially along line 3'3 of FIG. 1 with parts of the coupling being shown in phantom.

In the present instance, the helical splines 34 and 35 are formed on the inner end section 31 of the coupling shaft 20 and the outer end portion of the driven shaft 13. In particular, the splines 34 are external splines while the splines 35 are formed internally of the driven shaft 13 so as to extend in a generally radial direction into the chamber 16 of the shaft. Preferably, the splines 34 and 35 are slanted helically in a direction so as to urge the coupling shaft 20 toward the pellet 30 during normal power-driven rotation of the shaft. Holding the coupling shaft against axial movement in the opposite direction is a clip-ring 32. More particularly, as shown in FIG. 3, the helical spline 34 slants in the normal direction of rotation of the shaft 20 upon progressing in an inward direction along the shaft and toward its inner end. With this arrangement, as torque is being transmitted through the coupling shaft 20, an axial force is introduced urging the coupling toward the pellet 30. As long as the pellet is in its solid state, the coupling shaft 20 is supported against axial movement into the chamber 16, but when solder liquifies, the axial force propels the shaft inwardly thereby disengaging the outer end of the shaft from the drive member 11.

Figure 2:
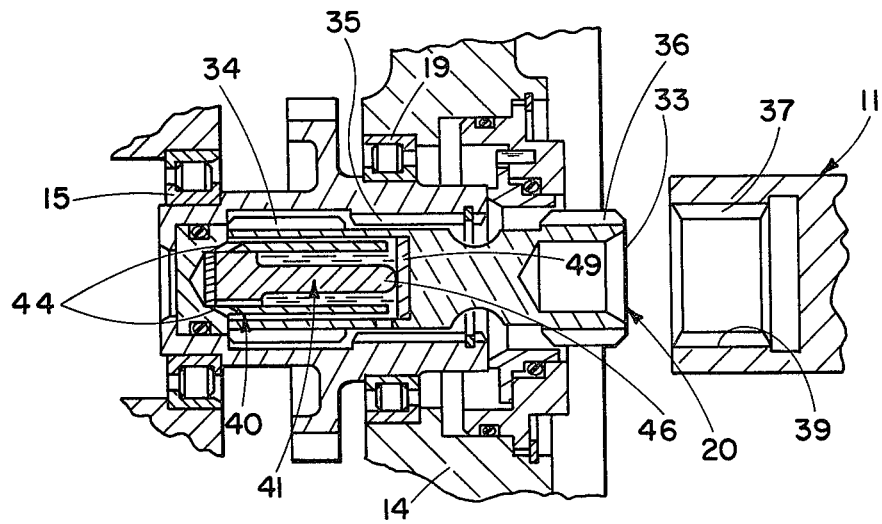
FIG. 2 is a cross-sectional view similar to FIG. 1 but showing parts of the coupling in moved positions.

As shown in FIG. 1, the outer end section 33 of the coupling shaft 20 is connected to the drive member 11 by means of axially straight splines 36 and 37. The splines 36 are external splines, being formed on the outside surface of the shaft 20, and the splines 37 are internal splines, defining in part an axially extending cavity 39 formed in the outer end portion of the drive member 11. Advantageously, the axial length of the splines 36 is less than the axial length of the splines 34 so as to assure a complete disconnection of the outer end section 33 of the shaft 20 from the driven member 11. This is because when the pellet 30 melts the axially directed force is applied to the coupling shaft 20 over an extended period of time due to the axial length of the splines 36. Accordingly, when disconnecting, the coupling shaft 20 is accelerated axially inward with sufficient force for the inner end of the coupling shaft to strike the inner end of the chamber 16. As shown in FIG. 2, this completely disengages the helical splines 34 and 35 and, because the splines 34 and 35 have an engageable length greater than the length of the splines 36, the coupling 20 is retracted from the drive member 11 into a position spaced a substantial distance from the exposed end of the drive member 11. Also during disengagement, the helical splines cause the coupling shaft to rotate, with the splines 34 and 35 misaligning upon separation. This misaligning of splines 34 and 35 tends to keep the shaft 20 from vibrating back toward the drive member 11. Thus, it will be appreciated that by virtue of the unique size relationship between helical splines 34 and 35 and axially straight splines 36, the present construction avoids the need for means such as a spring member or the like for holding the coupling shaft 20 in a position disconnected from the drive member 11.

To support the coupling shaft 20 in its normal operating position, the pellet 30 is telescoped into a cylinder 40 disposed within the drive shaft chamber 16 and a plunger 41 extends between the pellet and the coupling shaft 20 (see FIG. 1). Herein, the plunger includes an elongated body extending axially outward from within the cylinder 40 and into an axial recess 45 formed in the inner end section 31 of the shaft 20. Formed on the body is an enlarged inner end portion 43 having a diameter slightly less than the internal diameter of the cylinder thereby leaving a gap between the enlarged end of the plunger and the interior sidewalls of the cylinder. The gap provides a passage through which the liquid solder may flow when the pellet is melted. In addition, flow passages 44 are provided through the cylinder adjacent the inner end thereof for permitting liquid solder to flow through the cylinder and into the chamber 16. Opposite the inner end of the plunger body is a rounded outer end portion 46. In particular, the outer end portion is hemispherical in shape and engages a radially extending bearing surface 47 of a bearing disk 49 so that the plunger is articulated with respect to the coupling shaft 20. In this way, the enlarged end of the plunger is kept from wobbling against and cold working the outer end of the pellet 30 should there be a slight axial misalignment between the drive and driven shafts 11 and 13.

From the foregoing, it is apparent that the present invention brings to the art a new and improved thermally actuated disconnect coupling 20 which is more compact, stronger for its size and includes fewer parts than prior similar couplings. Herein, these advantages are achieved by utilizing the unique mating helical splines 34 and 35 on the coupling shaft 20 and the driven member 13, respectively, and by taking advantage of the axial force created by the helical splines to disconnect the coupling shaft from the drive shaft 11 when the pellet 30 melts. Moreover, by virtue of the unique size relationship between the axial lengths of the helical splines 34 and 35 and the axially straight splines 36 and 37 complete disconnection of the coupling shaft from the drive shaft is assured when the solder melts.

I claim:

1. In a thermally actuated disconnect coupling including a coupling shaft normally connected between drive and driven members to transmit torque from one of said members to the other, and an element for supporting said shaft against axial movement during normal in-service use of said coupling and being formed of a material adapted to give way generally at a preselected temperature to allow said shaft to move axially thereby disconnecting said drive and driven members, the improvement in said coupling comprising normally mating helical splines formed on said coupling shaft and one of said members to transmit the torque from said drive member to said driven member, said splines being helically slanted in a direction so as to urge said coupling shaft toward said element when torque is being transmitted by said coupling shaft in the normal direction of rotation of said shaft.

2. A thermally actuated disconnect coupling for use normally to transmit a driving torque between a drive member and a driven member, said coupling including a coupling shaft having opposite end sections integrally formed with each other so said shaft is continuous from one end to the other, means for connecting one of said end sections to one of said members normally to transmit torque between said one member and said shaft while permitting axial movement of said shaft relative to said one member when disconnecting the driven member from the drive member, normally mating helical splines formed on the other one of said members and the other one of said end sections of said shaft, means for supporting said shaft normally against axial movement so torque may be transmitted by said splines from said shaft to said other one of said members, said means including a fusible element adapted to melt and thereby release said shaft for axial movement under the urging of an axial force introduced in the coupling by said mating helical splines whereby said shaft is propelled in an axial direction to disconnect said drive and driven members from each other.

3. A coupling as defined by claim 2 wherein said opposite end sections of said shaft are inner and outer end sections, respectively, said mating helical splines being formed on said inner end section and said driven member.

4. A thermally actuated disconnect coupling for use normally to transmit a driving torque between a drive member and a driven member, said coupling including a coupling shaft having opposite end sections integrally formed with each other so said shaft is continuous from one end to the other, means for connecting one of said end sections to one of said members normally to transmit torque between said one member and said shaft while permitting axial movement of said shaft relative to said one member when disconnecting the driven member from the drive member, normally mating helical splines formed on the other one of said members and the other one of said end sections of said shaft, means for supporting said shaft normally against axial movement so torque may be transmitted by said splines from said shaft to said other one of said members, said means including a fusible element adapted to melt and thereby release said shaft for axial movement under the urging of an axial force introduced in the coupling by said mating helical splines whereby said shaft is propelled in an axial direction to disconnect said drive and driven members from each other said opposite end sections of said shaft being inner and outer end sections, respectively, said mating helical splines being formed on said inner end section and said driven member and said means for connecting one of said end sections to one of said members comprising normally mating splines formed on said outer end section and said drive member, said splines having an axially directed length less than the axially directed length of said helical splines.

5. A coupling as defined by claim 4 wherein said normally mating splines on said outer end section and said helical splines on said inner end section are both external splines, said normally mating splines on said drive member and said helical splines on said driven member being internal splines.

6. A coupling as defined by claim 4 wherein said driven member includes an axial chamber receiving said inner end section of said shaft, said means for normally supporting said shaft against axial movement including a cylinder disposed within said chamber between the inner end of said shaft and the inner end of the chamber and having an open end facing the inner end of the shaft, said fusible element comprising a solder pellet telescoped into said cylinder, a plunger located between and in engagement with said pellet and said inner end section of said shaft.

7. A coupling as defined by claim 6 wherein said plunger includes a rounded outer end portion for connection to said coupling shaft to permit articulation between said plunger and said shaft.

8. A coupling as defined by claim 7 wherein said coupling shaft includes an axial recess opening in an inward direction from the inner end of said shaft, said outer end portion of said plunger being telescoped into said recess, a bearing disk having a bearing surface extending radially across said recess adjacent the end thereof and said rounded end of said plunger engaging said bearing surface.

9. A coupling as defined by claim 7 wherein the inner end portion of said plunger is formed with a diameter slightly less than the diameter of said cylinder for melted solder to flow between said plunger and said cylinder, a passage formed through the side of said cylinder adjacent the inner end of said chamber for melted solder to flow from the interior of said cylinder into said chamber.

10. A thermally actuated disconnect coupling for use normally to transmit a driving torque between a drive member and a driven member, said coupling including a coupling shaft having inner and outer end sections integrally formed with each other so said shaft is continuous from one end thereof to the other, normally mating, axially straight splines formed on drive member and said outer end section for transmitting torque between said drive member and said shaft, normally mating helical splines formed on said driven member and said inner end section of said shaft, said helical splines having an axially directed length longer than the axially directed length of said straight splines, a fusible element normally disposed between the inner end of said shaft and said driven member for supporting said shaft against axial movement relative to said members so torque may be transmitted by said helical splines between said shaft and said driven member, said fusible element being adapted to melt when said driven member overheats thereby releasing axial support of said shaft so that said shaft is thrust axially in a direction to disconnect the outer end of said shaft from said drive member during in-service use.

* * * * *